A. E. SHUPE.
SAFETY PIN.
APPLICATION FILED JULY 14, 1909.
951,459. Patented Mar. 8, 1910.
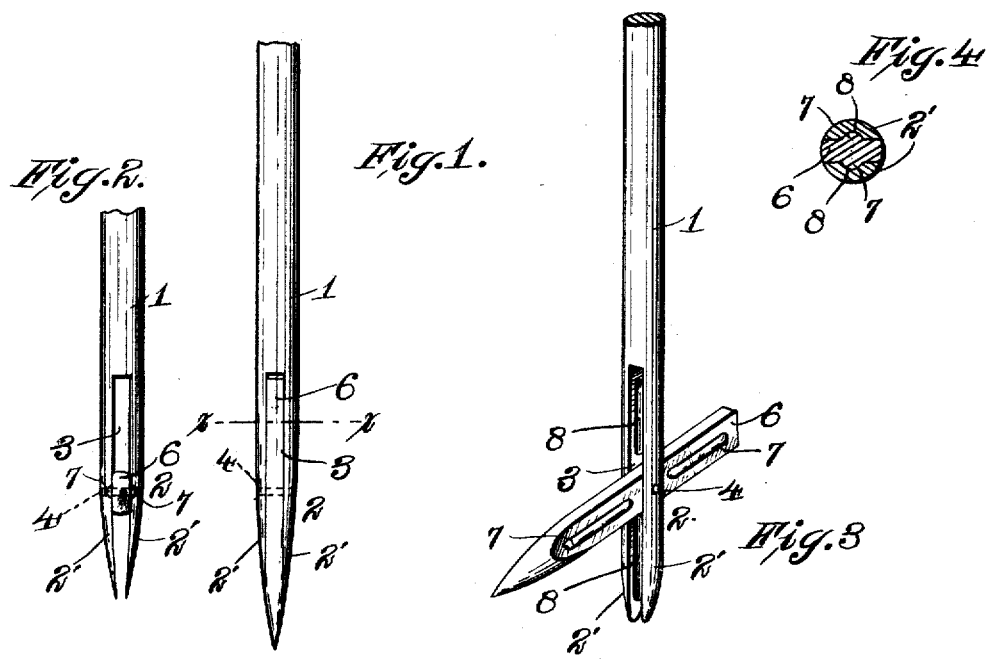
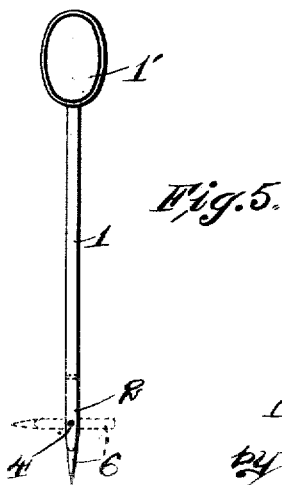
Witnesses:
A. A. Olson
W. C. Smith
Inventor:
Alfred E. Shupe
by Joshua R. H. Potts
his Attorney

UNITED STATES PATENT OFFICE.

ALFRED E. SHUPE, OF CHICAGO, ILLINOIS.

SAFETY-PIN.

951,459.

Specification of Letters Patent. Patented Mar. 8, 1910.

Application filed July 14, 1909. Serial No. 507,607.

*To all whom it may concern:*

Be it known that I, ALFRED E. SHUPE, a citizen of the United States, residing at Chicago, county of Cook, and State of Illinois, have invented certain new and useful Improvements in Safety-Pins, of which the following is a specification.

My invention relates to safety pins and has for its object the production of a pin of such character designed particularly for incorporation in a scarf or other similar pin to insure a positive or secure locking of the same to the article into which it is inserted.

Another object is to provide a safety pin as mentioned which may be readily arranged for insertion and which, when inserted, may be readily locked or anchored in such position.

A further object is to provide a safety pin which will be of neat and finished appearance, which will be effectual in use, and which will be simple and inexpensive of construction.

Other objects will appear hereinafter.

With these objects in view my invention consists in a safety pin characterized as above mentioned and in certain details of construction and arrangement of parts all as will be hereinafter fully described and particularly pointed out in the claims.

My invention will be more readily understood by reference to the accompanying drawing forming a part of this specification, and in which, Figure 1 is an enlarged side elevation of the pointed end portion of a safety pin embodying my invention, the locking member thereof being shown in inoperative position or in a position for insertion of the pin, Fig. 2 is a similar elevation illustrating the locking member in operative or locking position, Fig. 3 is a perspective view showing the locking member in substantially the same relative position as assumed thereby in Fig. 2, Fig. 4 is a slightly enlarged transverse section taken on the line x—x of Fig. 1, and Fig. 5 illustrates a preferred application of my device.

Referring now to the drawings, 1 indicates the body of a pin upon which may be carried a jewel or other ornate head 1'. The outermost or the insertible end portion 2 of said pin is forked or bifurcated as shown. Swingingly secured in the bifurcation 3 formed in said end of the pin body, upon a pin 4 extending therethrough and into the pin end portions 2', is a pointed member. The point 6 is so formed and is of such dimensions that, when the same is in a position in axial alinement with the pin body 1, or in a position as shown in Figs. 1 and 5, the same will entirely occupy the bifurcation 3 therein; the forward extremities of the end portions 2—2' and the members 6 being so formed that together or jointly they will, when said parts are arranged as stated, form a perfect symmetrical point. In order to effect a nice conjunction between said point and the pin body or shank, said shank is extended a considerable distance below said pivot pin and terminates in lower edges having a radius of curvature less than their distance from said pivot.

In order that the knife edged extremities of the ends 2—2' remain in close proximity with the sides of the member 6, when the latter is arranged for insertion, said ends are formed so as to be normally slightly inwardly disposed as shown in Fig. 2, hence, upon such arrangement of said member, will forcibly engage the sides of the same with the desired result.

In order to effect yieldingly holding the member 6 in alining position with the pin body during insertion, rounded tongues 7 are formed upon the contacting surfaces of the former and corresponding depressions or sockets 8 upon the contacting surfaces of the latter, that is upon the sides of the bifurcation 3 thereof; said tongues and depressions being so positioned upon said parts that, when the latter are in alining position, the same will interlock to yieldingly hold the pin and point in such a position. With such construction upon the pin being inserted with the point 6 and aliningly arranged therewith, the latter may evidently be swung from such a position to a position at substantially right angles thereto by engagement with the projecting pointed end thereof. When said point is in such position it is evident that displacement or withdrawal of the pin will positively be prevented, withdrawal being permitted only upon returning said point to its initial or alining position relative to the pin.

While I have shown what I deem to be the preferable form of my device I do not wish to be limited thereto as there might be various changes made in the details of construction and the arrangement of parts described without departing from the spirit of the invention comprehended within the scope of the appended claims. And although I have shown my device as applied to a safety pin the same may be embodied in any other construction to which it is applicable.

Having described my invention what I claim as new and desire to secure by Letters Patent is:

1. In a device of the class described, the combination of a pin shank provided with a transverse notch in its lower end adapted to contain a pivoted bar, the outer surfaces of the opposed portions being shaped toward a pin point, and a bar pivoted in said notch and shaped to form a smooth continuation of said pin shank to a point, substantially as described.

2. In a device of the class described, the combination of a pin-shank provided with a transverse notch in its lower end adapted to contain a pivoted bar and elongated recesses in either portion of said pin and on both sides of said bar pivot, the outer surface of the opposed portions being shaped toward a pin point, and a bar pivot in said notch and shaped to form a smooth continuation of said shank to a point, the said bar being provided with elongated projections adapted to engage said recesses, substantially as described.

3. In a device of the class described, the combination of a pin shank provided with a transverse notch in its lower end adapted to contain a pivoted bar and elongated recesses in either portion of said pin on both sides of said bar pivot, the outer surfaces of the opposed portions being inwardly bent and shaped toward a pin point, and a bar pivoted in said notch and shaped to form a smooth continuation of said pin shank to a point, the said bar being provided with elongated projections adapted to engage said recesses, substantially as described.

In testimony whereof I have signed my name to this specification in the presence of two subscribing witnesses.

ALFRED E. SHUPE.

Witnesses:
HELEN F. LILLIS,
JOSHUA R. H. POTTS.